(12) United States Patent
Wen

(10) Patent No.: US 9,316,275 B2
(45) Date of Patent: Apr. 19, 2016

(54) MECHANICAL TYPE DOUBLE-ACTING BRAKE CALIPER ASSEMBLY AND CALIPER HAVING THE SAME

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 139 days.

(21) Appl. No.: 14/214,965

(22) Filed: Mar. 16, 2014

(65) Prior Publication Data

US 2015/0176665 A1 Jun. 25, 2015

(30) Foreign Application Priority Data

Dec. 20, 2013 (TW) .............................. 102147410 A

(51) Int. Cl.
| | | |
|---|---|---|
| *F16D 65/00* | (2006.01) | |
| *F16D 55/228* | (2006.01) | |
| *F16D 65/18* | (2006.01) | |
| *F16D 55/00* | (2006.01) | |
| *F16D 121/14* | (2012.01) | |
| *F16D 125/36* | (2012.01) | |
| *F16D 125/60* | (2012.01) | |
| *F16D 125/64* | (2012.01) | |

(52) U.S. Cl.
CPC .......... *F16D 65/0068* (2013.01); *F16D 55/228* (2013.01); *F16D 65/0075* (2013.01); *F16D 65/18* (2013.01); *F16D 2055/002* (2013.01); *F16D 2121/14* (2013.01); *F16D 2125/36* (2013.01); *F16D 2125/60* (2013.01); *F16D 2125/64* (2013.01)

(58) Field of Classification Search
CPC ............. B62L 1/00; B62L 1/005; B62L 1/14; B62L 1/16; F16D 2125/60; F16D 2125/34; F16D 2125/36; F16D 2125/38; F16D 2121/14; F16D 15/228; B60T 11/043; B60T 11/046
See application file for complete search history.

(56) References Cited

U.S. PATENT DOCUMENTS

| | | | | |
|---|---|---|---|---|
| 3,907,074 | A * | 9/1975 | Rist ..................... | F16D 55/2262 188/196 BA |
| 5,979,609 | A * | 11/1999 | Tsai ......................... | B62L 1/00 188/26 |
| 6,148,964 | A * | 11/2000 | Huang ..................... | B62L 1/00 188/218 XL |
| 2009/0038893 | A1* | 2/2009 | Lin .......................... | B62L 1/16 188/24.22 |
| 2014/0305750 | A1* | 10/2014 | Harris .................... | B62L 1/005 188/26 |

FOREIGN PATENT DOCUMENTS

TW    DE 29914327 U1 * 12/1999 ................ B62L 1/00

OTHER PUBLICATIONS

Machine translation of DE 29914327 (no date).*

* cited by examiner

*Primary Examiner* — Nicholas J Lane

(57) ABSTRACT

A mechanical type double-acting brake caliper assembly and a caliper having the same are provided. Two caliper bodies are fixedly connected. Two axially-movable mechanisms are axially movably assembled to the two caliper bodies and each includes a driven end and an actuating end. Two arm members extend radially in opposite directions with an included angle from the respective driven ends. Each arm member has a first end and a second end. The first end is in a co-movable relationship with the driven end, and the second end has an installation portion for install of a cable. A first elastic member has an abutting portion and two elastic arms extending away from each other from the abutting portion. The abutting portion is engaged to one of the two caliper bodies, and distal ends of the two elastic arms are engaged with the respective installation portions.

9 Claims, 7 Drawing Sheets

MECHANICAL TYPE DOUBLE-ACTING BRAKE CALIPER ASSEMBLY AND CALIPER HAVING THE SAME

BACKGROUND OF THE INVENTION

1. Field of the Invention

The present invention relates to a caliper, more particularly to a mechanical type double-acting brake caliper assembly and caliper having the same.

2. Description of the Prior Art

Brake calipers are often applied on disk brake systems of vehicles such as cars, motorcycles and bicycles for braking. The conventional brake calipers have a caliper body, two linings and more than one piston. When drivers step on a brake paddle or press a brake handle, the piston in the brake caliper will be driven by hydraulic pressure to press the linings against a brake disc, and then the brake disc will gradually stop rotating due to friction so as to stop the tire from rotating.

The conventional brake calipers can generally be categorized into two types. The first type is a caliper body integrally formed, wherein two corresponding sides of the caliper body are formed with cylinders, and two lid members cover on the outer lateral openings of the two cylinder rooms to form a cylinder structure for receiving a piston; such structure is disclosed in TWM318572. The other type is a caliper body composed of two caliper parts, and each caliper part is integrally formed with a cylinder structure for receiving a piston; such structure is disclosed in TWM343636. However, the two above-mentioned brake calipers have more complicated structures; so it is more difficult and high-cost to manufacture their components, and it is inconvenient to assemble, disassemble, maintain and replace components. Users have to replace the whole brake caliper when a component is damaged, so the cost of maintenance is higher.

The conventional caliper disclosed in TWI397487 is in the form that two arms of the bicycle brake caliper assembly will co-act and move toward each other. However, in this kind of caliper structure, the two arms receive a force simultaneously, which means that each arm receives only half of the force; and when the two arms swing toward each other around a pivot point, there will be an included angle, so the two arms are unable to completely and flatly press on the brake disc. Thus, there is still room for improvement.

The present invention is, therefore, arisen to obviate or at least mitigate the above-mentioned disadvantages.

SUMMARY OF THE INVENTION

The main object of the present invention is to provide a mechanical type double-acting brake caliper assembly which can produce double braking ability and effect of the conventional structures. The present invention can achieve the effect of double-acting braking and increase the smoothness and effect of braking, and the present invention has a simple structure, so it is convenient to assemble, disassemble, maintain and replace components.

To achieve the above and other objects, the present invention provides a mechanical type double-acting brake caliper assembly, including two caliper bodies, two axially-movable mechanisms, two arm members and a first elastic member. Each caliper body has a recess, and an axial hole is disposed through the recess. The two caliper bodies are fixedly connected in a manner that the two recesses face each other and form a receiving space. The Two axially-movable mechanisms include a driven end extending outside and an actuating end disposed in the receiving space, and the actuating ends of the respective axially-movable mechanisms are provided for driving a lining assembly to move toward an object. The two arm members extend radially in opposite directions with an included angle from the respective driven ends, and each arm member has a first end and a second end corresponding to the first end. The first end is fixedly connected to the driven end in a co-movable relationship, and the second end is formed with an installation portion. One of the two installation portions is provided for a cable to dispose therethrough, and the other is provided for fixing a distal end of the cable. The first elastic member has an abutting portion and two elastic arms extending away from each other from the abutting portion. The abutting portion is engaged to one of the two caliper bodies, and distal ends of the two elastic arms are engaged with the respective installation portions, wherein when the cable is pulled, the two installation portions approach each other and the actuating ends of the respective axially-movable mechanisms is driven to move the lining assembly to come toward the object.

To achieve the above and other objects, the present invention further provides a mechanical type double-acting brake caliper assembly, including two caliper bodies, two axially-movable mechanisms, two arm members, a second elastic member and a third elastic member. Each caliper body has a recess, and an axial hole is disposed through the recess. The two caliper bodies are fixedly connected in a manner that the two recesses face each other and form a receiving space. The Two axially-movable mechanisms include a driven end extending outside and an actuating end disposed in the receiving space, and the actuating ends of the respective axially-movable mechanisms are provided for driving a lining assembly to move toward an object. The two arm members extend radially in opposite directions with an included angle from the respective driven ends, and each arm member has a first end and a second end corresponding to the first end. The first end is fixedly connected to the driven end in a co-movable relationship, and the second end is formed with an installation portion. One of the two installation portions is provided for a cable to dispose therethrough, and the other is provided for fixing a distal end of the cable. The second elastic member is saddled on the two caliper bodies, and the second elastic member has two installation ends disposed between corresponding arm member and caliper body and two lateral portions. The two installation portions are respectively disposed at the two driven ends, and the two lateral portions respectively extend upward from the two installation ends. The third elastic member is disposed between the two installation portions, wherein when the cable is pulled, the two installation portions approach each other and drive the actuating ends of the respective axially-movable mechanisms to move toward the object and compress the third elastic member at the same time.

To achieve the above and other objects, the present invention further provides a mechanical type double-acting brake caliper assembly, including one of the above-mentioned mechanical type double-acting brake caliper assembly, and further including a lining assembly. The lining assembly is disposed on the two caliper bodies and within the receiving space, and the lining assembly includes two movable linings respectively near the two actuating ends.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
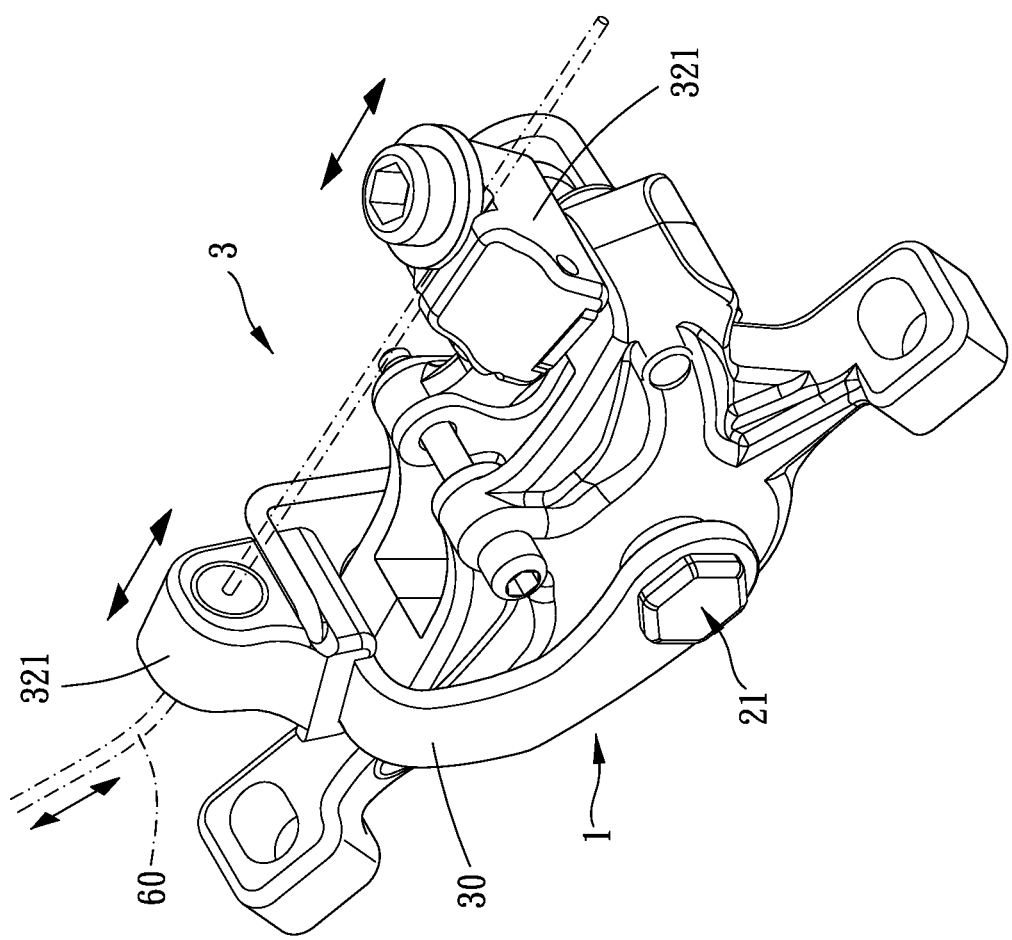
FIG. 1 is a stereogram of a first preferred embodiment of the present invention.
Figure 2:
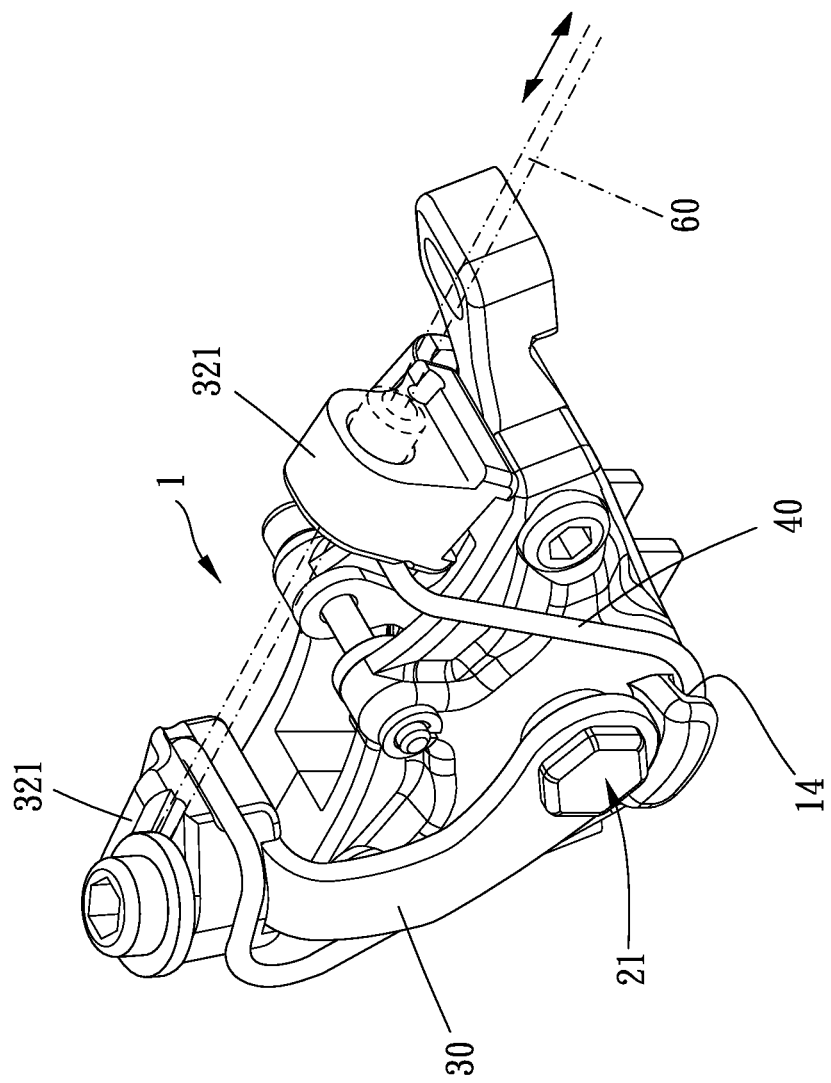
FIG. 2 is another stereogram of the first preferred embodiment of the present invention.
Figure 3:
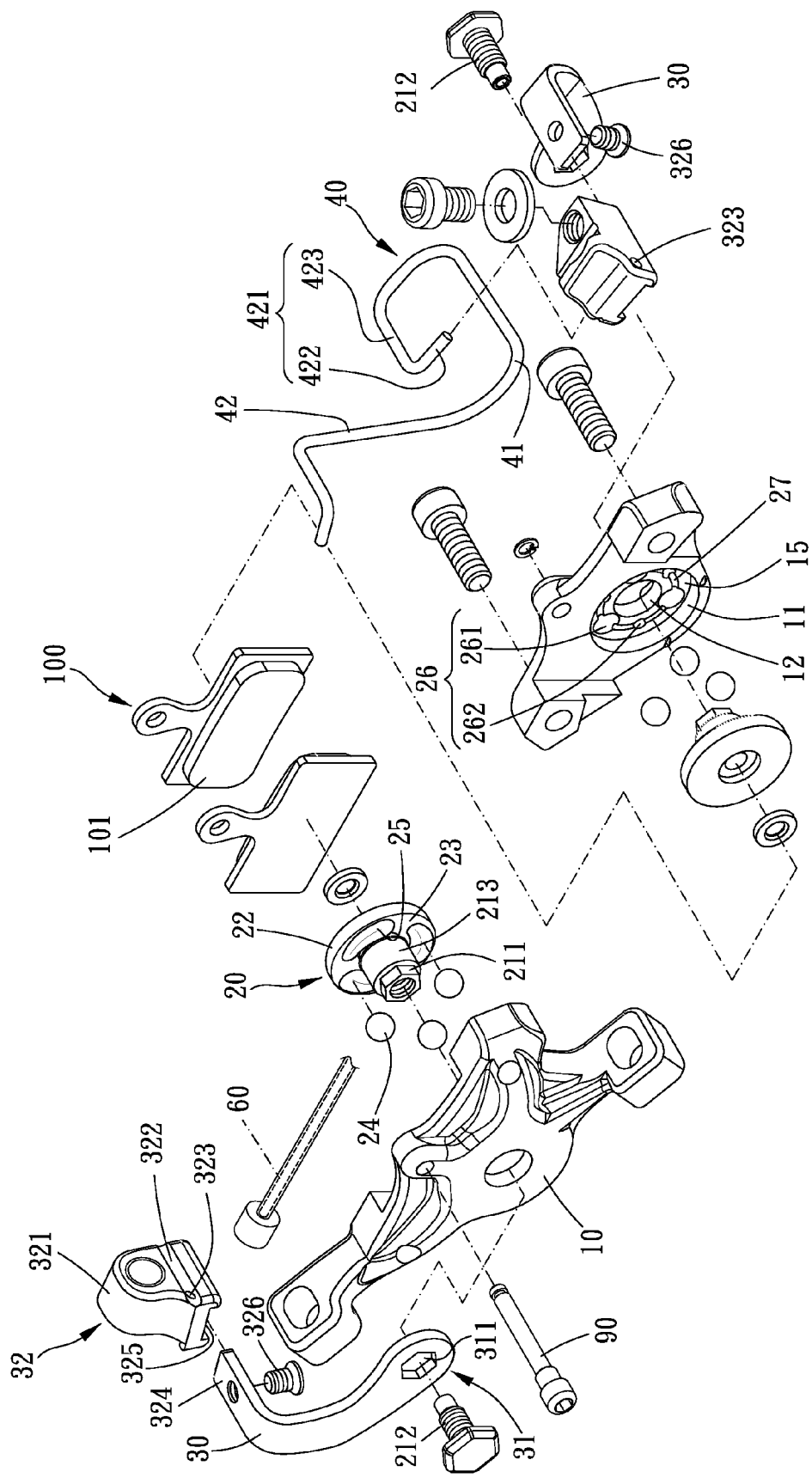
FIG. 3 is a breakdown drawing of the first preferred embodiment of the present invention.

Please refer to FIGS. 1 to 4 for a first preferred embodiment of the present invention. A mechanical type double-acting brake caliper assembly 1 of the present invention includes two caliper bodies 10, two axially-movable mechanisms 20, two arm members 30 and a first elastic member 40.

Each caliper body 10 has a recess 11, and an axial hole 12 is disposed through the recess 11. The two caliper bodies 10 are fixedly connected in a manner that the two recesses 11 face each other and form a receiving space 13. Specifically, a bottom end of either of the two caliper bodies 10 is formed with an engaging slot 14 opened downward, and each recess 11 has a first abutting face 15.

The two axially-movable mechanisms 20 are respectively disposed through the two axial holes 12 and axially movably assembled to the two caliper bodies 10. Each axially-movable mechanism 20 includes a driven end 21 extending outside and an actuating end 22 disposed in the receiving space 13. The actuating ends 22 of the respective axially-movable mechanisms 20 are provided for driving a lining assembly 100 to move toward an object 50 (such as a brake disc). Preferably, each caliper body 10 is formed with an opening communicating with the receiving space 30. A width of the lining assembly 100 is preferably smaller than that of the opening; therefore, the lining assembly 100 can be removed and replaced from the opening without disassembling the two caliper bodies 10; wherein each driven end 21 is formed with an axial bearing portion 211 whose radial section is non-circular, and specifically, the axial bearing portion 211 is formed by engaging a restricting member 212 with an axial member 213 of the actuating end 22. Each axially-movable mechanism 20 has a second abutting face 23 facing the first abutting face 15, and through the parallel rotation of the second abutting face 23 relative to the first abutting face 15, each axially-movable mechanism 20 drives the actuating end 22 to move toward the object 50. Specifically, each axially-movable mechanism 20 has a second abutting face 23 facing the first abutting face 15 and at least one rolling body 24, and the two first abutting faces 15 correspond to each other as viewed in an axial direction. One of the first abutting face 15 and the second abutting face 23 corresponding to each other is formed with at least one rail slot 25 extending along a circumferential direction around the axial hole 12, and the other is provided with at least one positioning portion 26 for positioning the at least one rolling body 24. The at least one rolling body 24 is disposed between corresponding rail slot 25 and positioning portion 26; the at least one rail slot 25 changes gradually in depth along the circumferential direction, and the rail slot 25 disposed on the two corresponding sides of the receiving space 13 and change in depth in two directions opposite to each other. In this embodiment, each first abutting face 15 has at least one positioning portion 26, and the second abutting face 23 is formed with the rail slot 25. Each positioning portion 26 includes two positioning troughs 261, 262 arranged in intervals with different depths, and the number of each positioning trough 261, 262 is three. The two groups of the positioning troughs 61, 262 are connected by a circumferential trough 27, and three of the rolling bodies 24 are disposed between corresponding positioning troughs 261, 262 and the rail slots 25, wherein the circumferential trough 27 can be provided for storing lubricative materials such as butter to reduce friction among the components and enhance the anti-corrosion effect. Furthermore, through positioning the rolling bodies 24 in the deeper positioning troughs 261, the two actuating ends 22 can be moved away from each other and adapted for installation of new or thicker linings; through positioning the rolling bodies 24 in the shallower positioning troughs 262, the two actuating ends 22 can be closer to each other and adapted to abraded or thinner linings so as to achieve the most preferable braking effect. Regarding adjustment, through loosening restricting member 212 and rotating the actuating end 22, the rolling bodies 24 can be moved from a group of the positioning troughs 261 into another group of the positioning troughs 262 so as to change the distance between the two actuating ends 22. On one hand, the circumferential trough 27 can act as a sliding trail of the rolling bodies 24; on the other hand, the attraction between the first abutting face 15 and the second abutting face 23 due to vacuum effect can be prevented so as not to influence rotation.

The two arm members 30 extend radially in opposite directions with an included angle from the respective driven ends 21, and each arm member 30 has a first end 31 and a second end 32 corresponding to the first end 31. The first end 31 is fixedly connected to the driven end 21 in a co-movable relationship, and the second end 32 has an installation portion 321. One of the two installation portions 321 is provided for a cable 60 to dispose therethrough, the other is provide for fixing a distal end of the cable 60. Specifically, each installation portion 321 has a horizontal trough 322 substantially parallel to the axial direction of the axial hole 12 and a vertical hole 323 communicating with the horizontal trough 322, wherein each horizontal trough 322 relatively crosses over the two caliper bodies 10. More specifically, each first end 31 has a bearing hole 311 provided for being disposed around corresponding axial bearing portion 211, and the axial bearing portion 211 and the bearing hole 311 are non-circular and compensatory in shape. Preferably, the installation portion 321 of each arm member 30 can be adjustably disposed at the second end 32 along a horizontal direction, and the horizontal direction traverses the two caliper bodies 10, wherein each second end 32 includes an inserting portion 324, each installation portion 321 includes a sliding groove 325, the sliding groove 325 of each installation portion 321 can slide along the inserting portion 324 and be positioned by a positioning member 326; thereby, the relative positions of the two installation portions 321 can be adjusted in accordance with different environmental requirements (for example, the relative positions of the two installation portions 321 can be adjusted according to the extending direction of the cable 60 or the relative angle of the caliper 3 mounted on a car) so as to make the braking operation more smooth and more effective.

The first elastic member 40 has an abutting portion 41 and two elastic arms 42 extending away from each other from the abutting portion 41. The abutting portion 41 is engaged to one of the two caliper bodies 10, and the distal ends of the two elastic arms 42 are engaged with the respective installation portions 321. Specifically, the first elastic member 40 is substantially V-shaped. The distal end of the respective elastic arms 42 is respectively formed with a hook portion 421, and the two hook portions 421 are respectively engaged with the two installation portions 321. Specifically, the distal end of each hook portion 421 has a vertical portion 422 and a horizontal portion 423 horizontally extending from the vertical portion 422. The vertical portion 422 of each hook portion 421 is inserted in the vertical hole 323 of corresponding installation portion 321. The horizontal portion 423 of each hook portion 421 is elastically abutted within the horizontal trough 322 of corresponding installation portion 321. The abutting portion 41 is restrictedly engaged in the engaging slot 14, and the two elastic arms 42 are arranged by the same side of the caliper body 10 and respectively extend toward upper-right and upper-left. Preferably, each elastic arm 42 is at least partially abutted against a lateral face of the caliper body 10.

Figure 4:
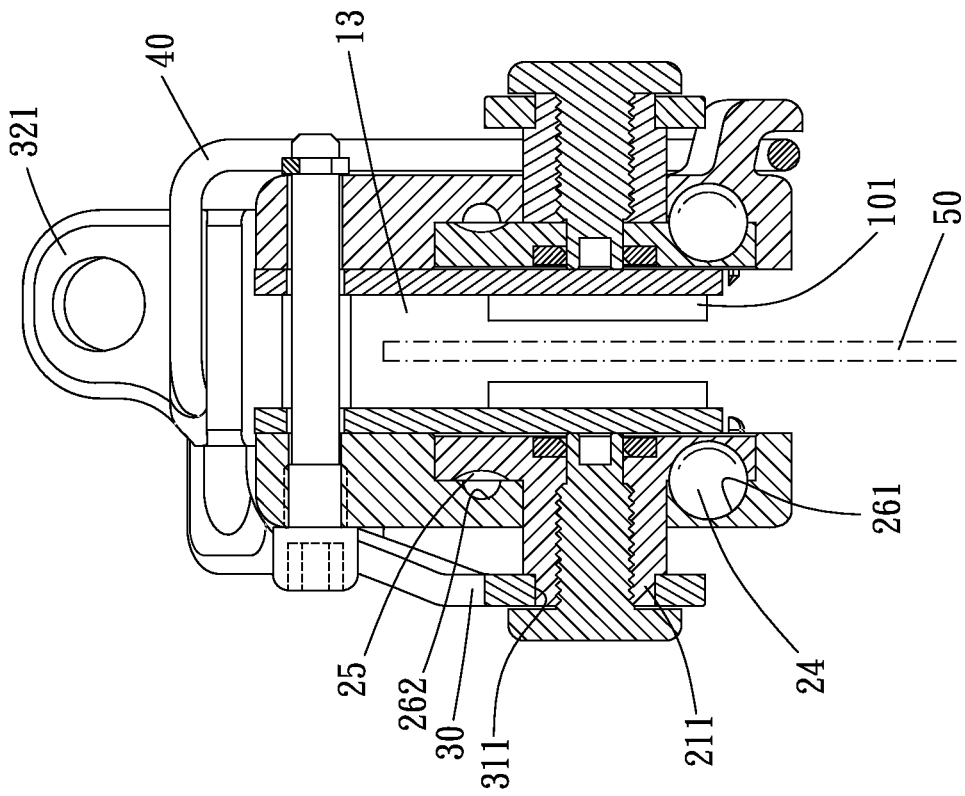
FIGS. 4 and 5 are drawings showing the braking action of the first preferred embodiment of the present invention.
Figure 4:
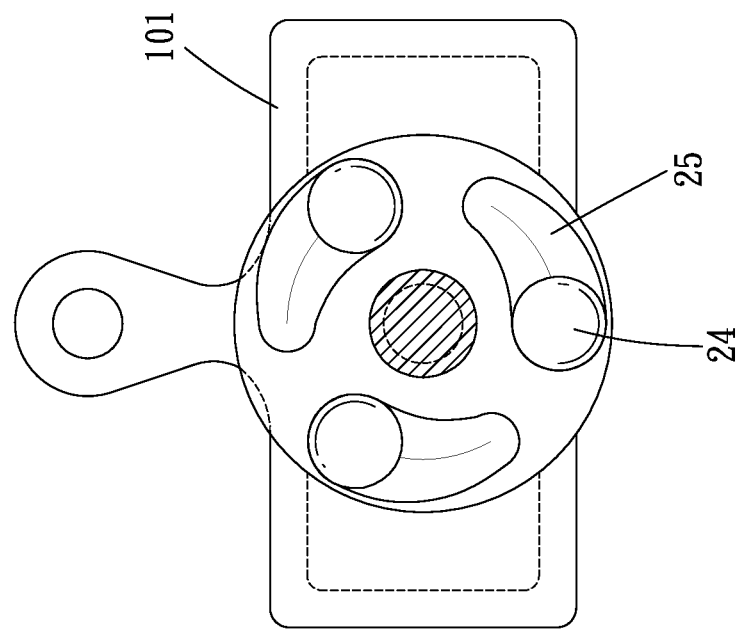
Figure 5:
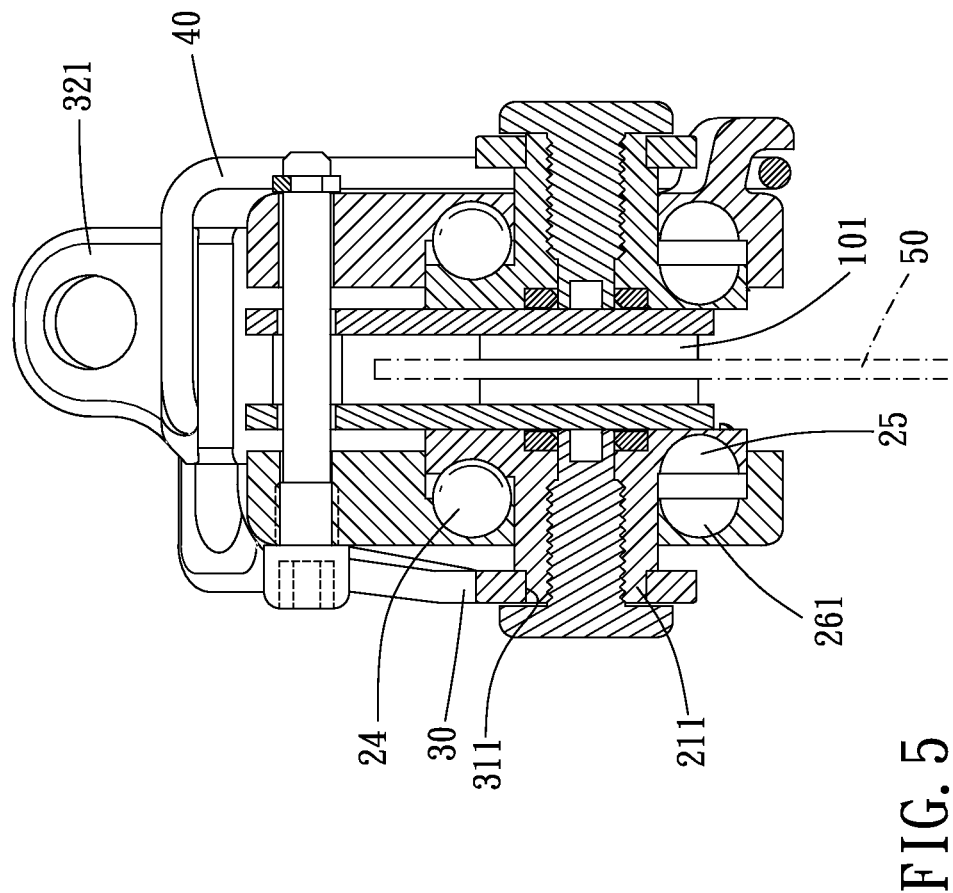
Figure 5:
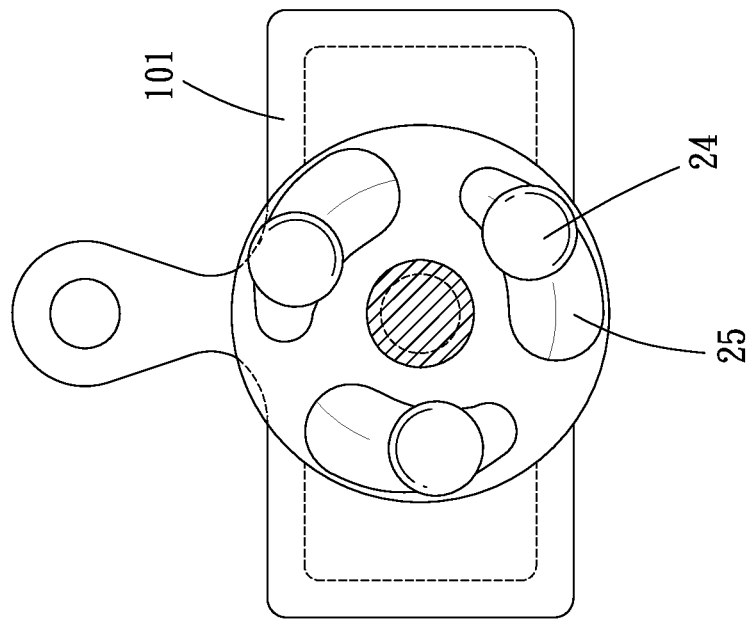

Please further refer to FIGS. 4 and 5. When the cable 60 is pulled, the two installation portions 321 approach each other and drive the actuating ends 22 of the two axially-movable mechanisms 20 to move the lining assembly 100 to come toward the object 50, wherein the actuating end 22 of one of the axially-movable mechanisms 20 connected to the distal end of the cable 60 will push a lining 101 to abut against a side of the object 50. When the cable 60 is continuously pulled, the actuating end 22 of another axially-movable mechanism 20 will be driven to move another lining 101 to abut against the other side of the object 50. A force pulling the cable 60 is assumed to be F, then when the two linings 101 are abutted against the object 50, forces applied to the two actuating ends 22 are both F (of equal magnitude but in opposite directions) which can produce double braking ability and effect of the conventional structures. It is noted that when the cable 60 is pulled or released, the two installation portions 321 may relatively move in an axial direction; however, through the elasticity produced by the two elastic arms 42 at least partially abutted against the lateral face of the caliper body 10, the two installation portions 321 will naturally tend to remain on a phantom plane and further increase braking effect.

Figure 6:
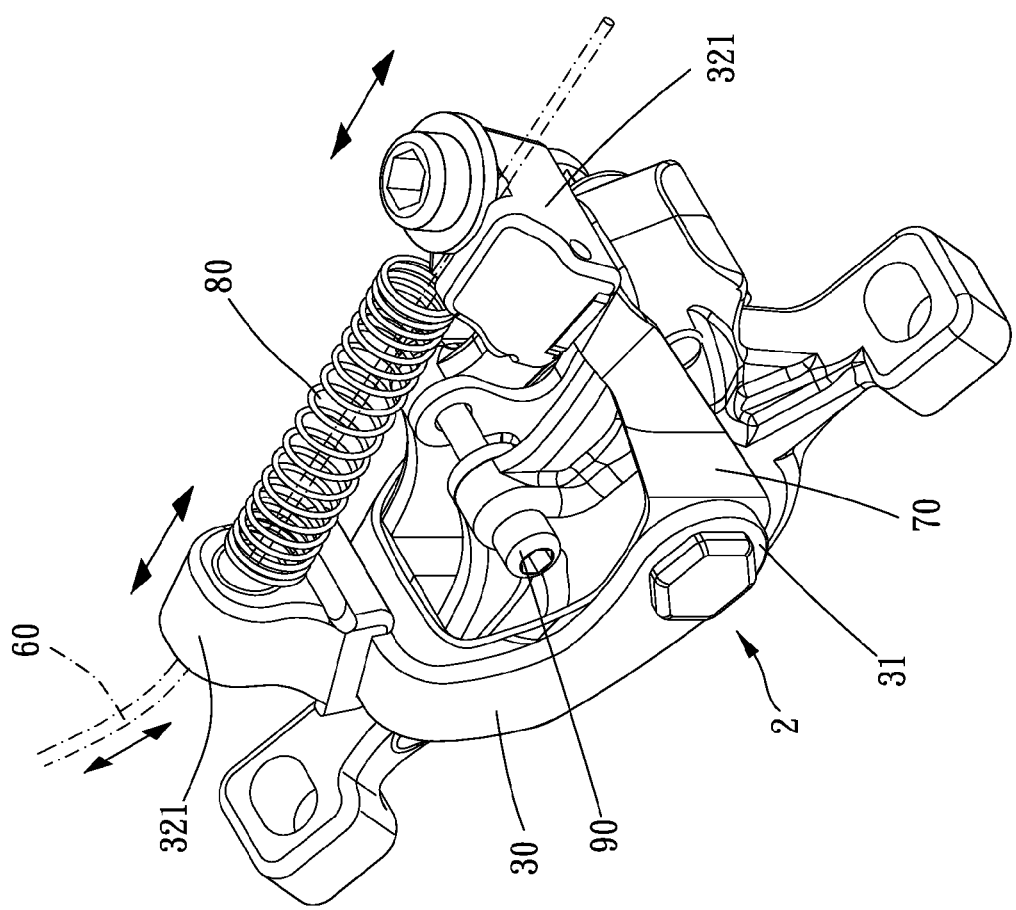
FIG. 6 is a stereogram of a second preferred embodiment of the present invention.
Figure 7:
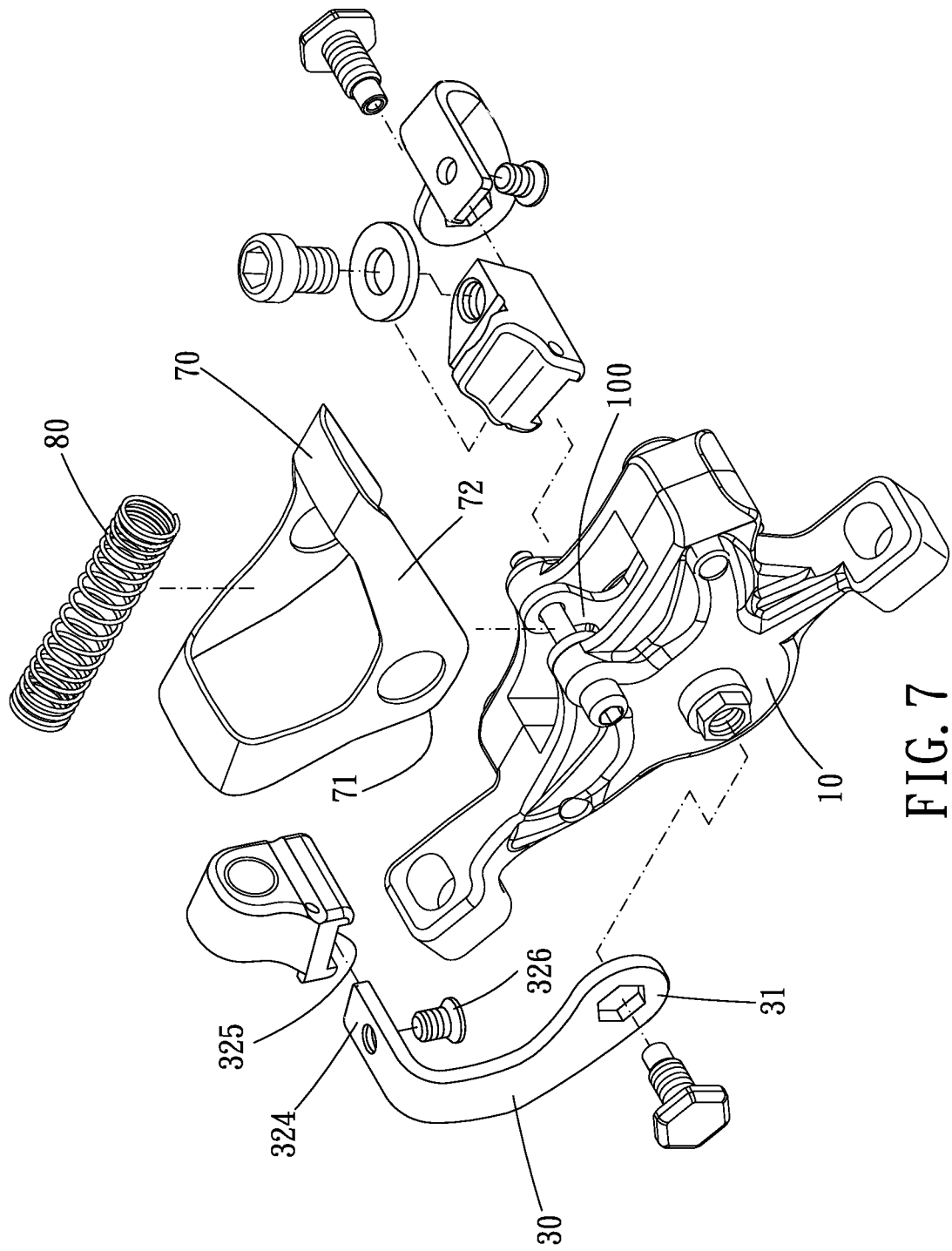
FIG. 7 is a breakdown drawing of the second preferred embodiment of the present invention.

Compared with the above-mentioned first preferred embodiment, a second preferred embodiment of a mechanical type double-acting brake caliper assembly 2 is shown in FIGS. 6 and 7. A second elastic member 70 is saddled on the two caliper bodies 10. The second elastic member 70 has two installation ends 71 disposed between corresponding arm member 30 and caliper body 10 and two lateral portions 72. The two installation ends 71 are respectively disposed at the two driven ends 21. The two lateral portions 72 are respectively extend upward from the two installation ends 71. Specifically, the second elastic member 70 is an annular member in substantially saddle shape, and the two installation ends 71 are respectively abutted outward against the two first ends 31; thereby, the two arm members 30 can remain on relative positions in an axial direction. A third member 80 (such as a spiral spring) is disposed between the two installation portions 321. When the cable 60 is pulled, the two installation portions 321 approach each other and drive the actuating ends 22 of the two axially-movable mechanisms 20 to move the lining assembly 100 to come toward the object 50 and compress the third elastic member 80 at the same time. When the cable 60 is released, the third elastic member 80 can elastically push the two installation portions 321 to move away from each other and return to their original positions, wherein through the functions of the second elastic member 70 and the third elastic member 80, it is assured that the two installation portions 321 can always act in the most preferable relative positions to make the braking operation smooth and precise.

Please refer to FIGS. 1 to 4 for a mechanical type double-acting brake caliper assembly 3 of the present invention, including the above-mentioned mechanical type double-acting brake caliper assembly 1 (or the above-mentioned mechanical type double-acting brake caliper assembly 2), and further including a lining assembly 100. Specifically, the lining assembly 100 is disposed on the two caliper bodies 10 and within the receiving space 13, and the lining assembly 100 includes two movable linings 101 respectively near the two actuating ends 22. A fixing pin 90 is inserted in the two caliper bodies 10, and the two linings 101 are movably disposed on the fixing pin 90. When the cable 60 is pulled, the two arm members 30 are driven to move the two installation portions 321 toward each other, and the two actuating ends 22 is also axially driven to move the two linings 101 to press on the object 50 (brake disc). At the moment, the two elastic arms 42 are compressed to produce a recovery force. When the cable 60 is released, the two compressed elastic arms 43 drive the two installation portions 321 to move away from each other and return to their original positions with the recovery force so that the two linings 101 will be unabutted against the object 50 (brake disc).

Given the above, through the cooperation of the two arm members and the two axially-movable mechanisms, the mechanical type double-acting brake caliper assembly of the present invention can produce double braking ability and effect of the conventional structures.

Furthermore, through assembling the mechanical type double-acting brake caliper assembly of the present invention, the double-acting braking effect of a double-pressure cylinder can be achieved. The present invention has a simple structure, so it is easy to assemble and low-cost to manufacture. In addition, it is convenient to assemble, disassemble, maintain and replace the components.

In addition, the cooperation between the third elastic member and one of the first and the second elastic members makes the two installation portions naturally return to their original positions and tend to remain on a hypothetical plane so as to further increase the smoothness and effect of braking.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A mechanical double-acting brake caliper assembly, including:

two caliper bodies, each having a recess, an axial hole communicated with the recess, the two caliper bodies fixedly connected to each other with the two recesses face-to-face, the two caliper bodies forming a receiving space between and communicating the two recesses;

two axially-movable mechanisms, respectively disposed through the two axial holes and axially movably assembled to the two caliper bodies, each axially-movable mechanism including a driven end extending outside a respective one of the two caliper bodies and an actuating end arranged in the receiving space, the actuating end of the respective axially-movable mechanisms provided for driving a lining assembly to move toward an object;

two arm members, extending in opposite directions with an included angle from the respective driven ends, each arm member having a first end and a second end corresponding to the first end, each of the first ends fixedly connected to a respective one of the driven ends in a co-rotatable relationship, each of the second ends having an installation portion, one of the installation portions of the second ends provided for a cable to dispose therethrough and the other provided for fixing a distal end of the cable;
a first elastic member, having an abutting portion and two elastic arms extending away from each other from the abutting portion, the abutting portion engaged to one of the two caliper bodies, distal ends of the two elastic arms engaged with the respective installation portions;
wherein when the cable is pulled, the installation portions approach to each other and the actuating ends of the respective axially-movable mechanisms are driven to move the lining assembly to come toward the object;
wherein the distal end of the respective elastic arms is formed with a hook portion, each installation portion has a horizontal trough substantially parallel to the axial direction of the axial hole and a vertical hole communicating with the horizontal trough, the distal end of the respective hook portions has a vertical portion and a horizontal portion extending horizontally from the vertical portion, the vertical portion of the respective hook portions is inserted in the vertical hole of corresponding installation portion, and the horizontal portion of the respective hook portions is elastically abutted within the horizontal trough of corresponding installation portion.

2. The mechanical double-acting brake caliper assembly of claim 1, wherein each recess has a first abutting face, each axially-movable mechanism has a second abutting face and at least one rolling body, each second abutting face faces a respective one of the first abutting faces, one of the first abutting face and the second abutting face corresponding to each other is formed with at least one rail slot extending along a circumferential direction of the axial hole and the other is provided with at least one positioning portion for positioning the at least one rolling body, the at least one rolling body is disposed between corresponding rail slot and positioning portion, the at least one rail slot changes gradually in depth along the circumferential direction, and the rail slots are disposed on two corresponding sides of the receiving space and change in depth in opposite directions.

3. The mechanical double-acting brake caliper assembly of claim 2, wherein each positioning portion includes a plurality of pairs of positioning troughs arranged in intervals and in different depths.

4. The mechanical double-acting brake caliper assembly of claim 1, wherein each driven end has an axial bearing portion, each first end is provided with a bearing hole for disposing around corresponding axial bearing portion, and the axial bearing portion and the bearing hole are non-circular and compensatory in shape.

5. A mechanical double-acting brake caliper assembly, including:
two caliper bodies, each having a recess, an axial hole communicated with the recess, the two caliper bodies fixedly connected to each other with the two recesses face-to-face, the two caliper bodies forming a receiving space between and communicating the two recesses;
two axially-movable mechanisms, respectively disposed through the two axial holes and axially movably assembled to the two caliper bodies, each axially-movable mechanism including a driven end extending outside a respective one of the two caliper bodies and an actuating end arranged in the receiving space, the actuating end of the respective axially-movable mechanisms provided for driving a lining assembly to move toward an object;
two arm members, extending in opposite directions with an included angle from the respective driven ends, each arm member having a first end and a second end corresponding to the first end, each of the first ends fixedly connected to a respective one of the driven ends in a co-rotatable relationship, each of the second ends having an installation portion, one of the installation portions of the second ends provided for a cable to dispose therethrough and the other provided for fixing a distal end of the cable;
a first elastic member, having an abutting portion and two elastic arms extending away from each other from the abutting portion, the abutting portion engaged to one of the two caliper bodies, distal ends of the two elastic arms engaged with the respective installation portions;
wherein when the cable is pulled, the installation portions approach to each other and the actuating ends of the respective axially-movable mechanisms are driven to move the lining assembly to come toward the object;
wherein a bottom end of one of the two caliper bodies is formed with an engaging slot opening downward, the abutting portion is restrictedly engaged within the engaging slot, the two elastic arms are arranged by the same side of the caliper body and respectively extend toward upper-right and upper-left, and each elastic arm is at least partially abutted against a lateral face of the caliper body.

6. A mechanical double-acting brake caliper assembly, including:
two caliper bodies, each having a recess, an axial hole communicated with the recess, the two caliper bodies fixedly connected to each other with the two recesses face-to-face, the two caliper bodies forming a receiving space between and communicating the two recesses;
two axially-movable mechanisms, respectively disposed through the two axial holes and axially movably assembled to the two caliper bodies, each axially-movable mechanism including a driven end extending outside a respective one of the two caliper bodies and an actuating end arranged in the receiving space, the actuating end of the respective axially-movable mechanisms provided for driving a lining assembly to move toward an object;
two arm members, extending in opposite directions with an included angle from the respective driven ends, each arm member having a first end and a second end corresponding to the first end, each of the first ends fixedly connected to a respective one of the driven end in a co-rotatable relationship, each of the second ends having an installation portion, one of the installation portions of the second ends provided for a cable to dispose therethrough and the other provided for fixing a distal end of the cable;
a saddle elastic member, saddled on the two caliper bodies, having two installation ends disposed between corresponding arm member and caliper body and two lateral portions, the installation ends are respectively disposed at the two driven ends, the two lateral portions respectively extend upward from the installation ends;
a return elastic member, disposed between the installation portions;
wherein when the cable is pulled, the installation portions get closer to each other and drive the actuating ends of the respective axially-movable mechanisms to move the lining assembly to come toward the object and to compress the return elastic member at the same time.

7. The mechanical-type double-acting brake caliper assembly of claim 6, wherein each recess has a first abutting face, each axially-movable mechanism has a second abutting face and at least one rolling body, each second abutting face faces a respective one of the first abutting faces, one of the first abutting face and the second abutting face corresponding to each other is formed with at least one rail slot extending along a circumferential direction of the axial hole and the other is provided with at least one positioning portion for positioning the at least one rolling body, the at least one rolling body is disposed between corresponding rail slot and positioning portion, the at least one rail slot changes gradually in depth along the circumferential direction, and the rail slots are disposed on two corresponding sides of the receiving space and change in depth in opposite directions.

8. The mechanical double-acting brake caliper assembly of claim 6, wherein the saddle elastic member is an annular member in substantially saddle shape, and the installation ends are respectively elastically abutted outward against the two first ends.

9. A mechanical double-acting brake caliper, including the mechanical double-acting brake caliper assembly of claim 1, and further including:
 a lining assembly, disposed on the two caliper bodies and within the receiving space, the lining assembly including two movable linings disposed between the two actuating ends.

* * * * *